United States Patent [19]
Wu

[11] Patent Number: 5,305,699
[45] Date of Patent: Apr. 26, 1994

[54] PORTABLE SEEDER HAVING A TWO SECTION TURNING PLATE

[75] Inventor: Suian Wu, Chang Hua Hsien, Taiwan

[73] Assignee: Fwu Tien Industry Co., Ltd., Chang Hua Hsien, Taiwan

[21] Appl. No.: 998,134

[22] Filed: Dec. 29, 1992

[51] Int. Cl.$^5$ .................... A01C 11/00; B23Q 7/04
[52] U.S. Cl. .................................. 111/183; 221/217
[58] Field of Search ............... 111/130, 170, 171, 183, 111/184, 185, 177, 186, 187; 221/185, 211, 217, 221, 222

[56] References Cited

U.S. PATENT DOCUMENTS

| | | | |
|---|---|---|---|
| 2,975,936 | 3/1961 | Rousek | 111/184 X |
| 3,796,346 | 3/1974 | Ribouleau | |
| 4,664,290 | 5/1987 | Martin et al. | 111/184 |
| 5,088,766 | 10/1991 | Deckler | 111/184 X |
| 5,143,002 | 9/1992 | Gaspardo | 111/184 |

Primary Examiner—Clifford D. Crowder
Assistant Examiner—Larry D. Worrell, Jr.
Attorney, Agent, or Firm—Browdy and Neimark

[57] ABSTRACT

An improved portable seeder particularly adapted for agricultural cultivation of seedlings is characterized in its turning plate driven by a transmission mechanism having a two-section structure including a concentrically disposed inner and outer section; and a base mount disposed under the turning plate is provided with a number of through holes in correspondence to the outer section of the turning plate so as to prevent the turning plate from getting stuck in operation by the seeds. The present seeder employs a dispelling stick which is actuated to move to and fro by the transmission mechanism; and the base mount provided with a plurality of through holes thereon is disposed under the turning plate so as to permit seeds falling under the turning plate to be expelled without getting the same stuck in operation. A feeder plate and a control plate each having a pair of feeding holes that are disposed in non-alignment with each other so that the rotatation of the control plate can vary the size of the spreading opening and a rudder member is also provided whereby the operation thereof becomes easy and secure with less chance of getting stuck, and the seeding process is carried out in a more smooth and even manner.

3 Claims, 5 Drawing Sheets

PORTABLE SEEDER HAVING A TWO SECTION TURNING PLATE

BACKGROUND OF THE INVENTION

The present invention relates to an improved portable seeder which is particularly designed to prevent the seeder from getting stuck by tiny seeds or by fertilizer grains falling under the turning plate in operation; seeds and fertilizer grains can be easily removed from between the turning plate and the base mount which is provided with a number of through holes thereon. The present seeder can be operated with ease and seeds are dispensed evenly and the stageless control of the seed dispensing means makes the present seeder function in a more ready manner.

Generally, the conventional seeder, as shown in FIG. 6, is equipped with a base mount 10 in connection to a transmission mechanism 12 having a rock arm 11. The rotation shaft 13 of the transmission mechanism 12 sticking out of the surface of the base mount 10 is fixedly associated with a turning board 14; and a cover 15 is disposed on top of the assembly as a cover only with an opening left. A rudder member 16 housed in the cover 15 is disposed above the turning board 14 with a fixed stop plate 17 located at the side of the opening and a container 18 is fixed on the top thereof. A control stick 19 led through the container 18 is engaged with a feeder control disc 20 so that the actuation of the control stick 19 can vary the area of the opening of the control disc 20 in association with the bottom opening of the container 18. A top lid 21 is located on top of the container 18. The middle of a crank arm 22 and the end of a fixing rod 23 are engaged with a fixing piece disposed at the back of the cover 15, and the upper end of the fixing rod 23 is secured to the container 18. The lower end of the crank arm 22 having a slot 24 is engaged with an eccentric shaft disposed at the end of the rock arm 11 of the transmission mechanism 12, and the upper end thereof is pivotally engaged with a swing arm 25 extended from the container 18. A pickaback strap 26 associated with the container 18 is provided in addition.

The above cited prior art seeder can be supplied with a great amount of seeds in the container 18, and an operator has to actuate the rock arm 11 to spin so as to make the rotation shaft 13 and the turning board 14 to rotate; meanwhile, the crank arm 22 in cooperation with the swing arm 25, rudder member 16 and the feeder control disc is controlled and adjusted by the control stick, seeds or fertilizer grains are dispensed into the turning board 14 whereby seeds or fertilizer grains can be spread in a specific area.

This kind of prior art seeder is equipped with a simply structured turning board 14 having a number of radially disposed dispelling plates thereon; the diameter of the turning board 14 is smaller than the dimension of the cover 15 so as to permit the turning board to rotate freely; and the turning board 14 mounted to the base mount is provided with no through holes at all. Thus, the seeds or fertilizer grains falling into the space between the turning board and the cover due to the centrifugal force will easily cause the turning board 14 to get stuck. To remove the trouble seeds or grains from the area is relatively difficult because the base mount 10 is provided with no through holes at all.

Moreover, the control stick 19 extending through the container 18 from top to bottom is relatively hard to actuate due to the friction against the seeds and fertilizer grains in one aspect; and the control disc 20 disposed at the bottom thereof is difficult to rotate in another aspect.

The swing arm 25 is actuated to rock by the crank arm 22 driven by the transmission mechanism 12, the pressure produced as a result of the accumulation of the seeds and fertilizer grains thereon makes the same operate with difficulty, resulting in discontinuous and uneven discharge of the seeds and grains.

Furthermore, the rudder member 16 is provided with a flexible means engaged with a number of specific grooves disposed on the periphery of the cover 15, and the rudder member 16 is able to move only with the flexible means disengaged with the grooves, the staged control of the rudder member 16 and the disengagement of the flexible means make the operation of the same inconvenient.

SUMMARY OF THE INVENTION

Therefore, the primary object of the present invention is to provide an improved portable seeder which is equipped with a two-section turning plate having an inner and outer section with the former at a higher level than the latter and a number of recessed grooves having an opening cut on the right end of its outer edge respectively are disposed on the outer section.

Another object of the present invention is to provide an improved portable seeder which is equipped with a number of through holes on the periphery of the base mount in correspondence to the turning plate so as to permit seeds or fertilizer grains falling therebetween can be expelled automatically without interfering with the normal operation, and those stuck seeds or fertilizer grains can be further dispensed for a second time.

One still further object of the present invention is to provide an improved portable seeder provided with a control plate and a rudder member which is equipped with a protruded control pin sticking out of the cover so as to permit the same to be controlled easily and stagelessly.

DETAILED DESCRIPTION OF THE PREFERRED EMBODIMENT

Figure 1:
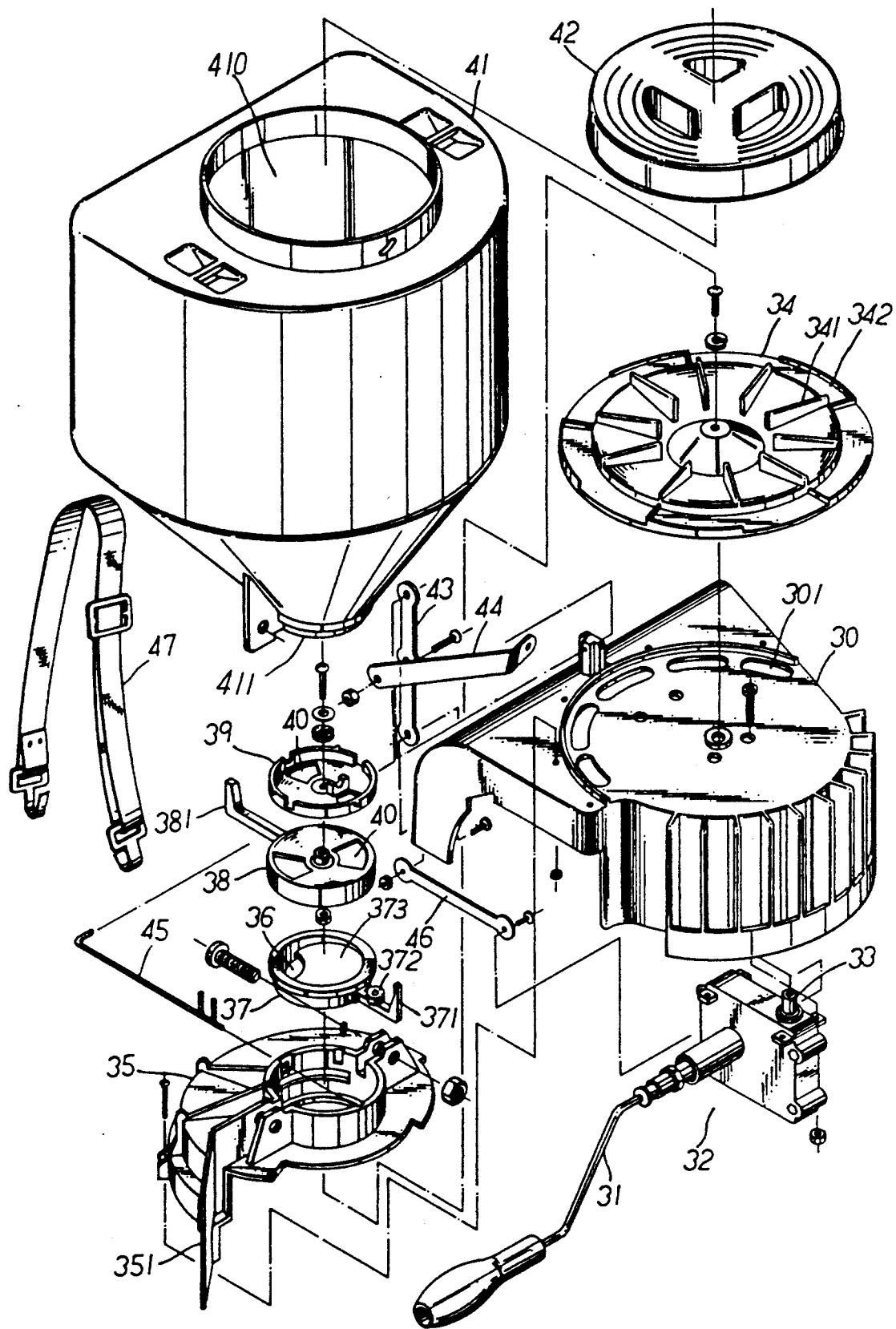
FIG. 1 is a perspecitive diagram showing the exploded components of the present invention.
Figure 2:
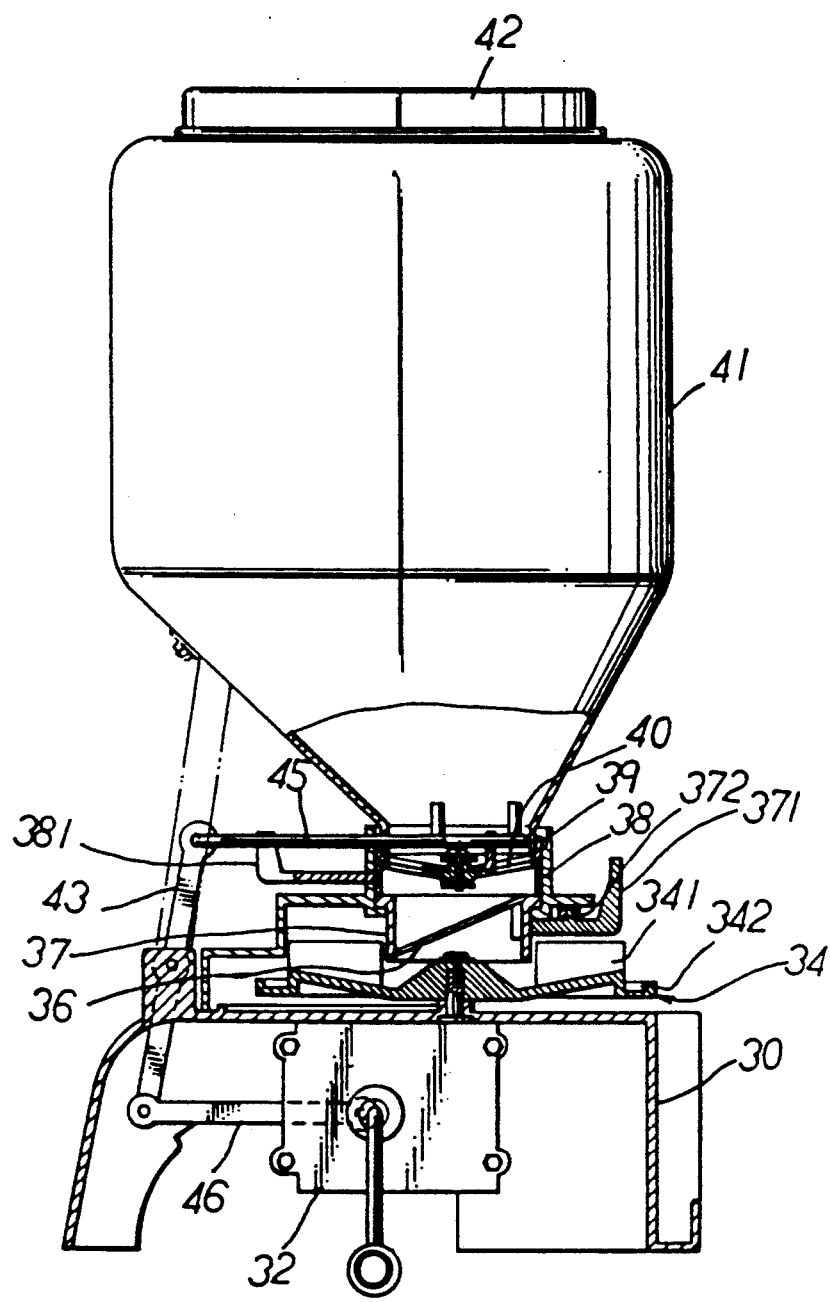
FIG. 2 is a partially sectional view of the present invention.

Referring to FIGS. 1, 2, an improved seeder of the present invention is comprised of a base mount 30 in association with a transmission means 32 having a rock arm 31; the rotation shaft 33 of the transmission means 32 sticking out of the base mount 30 is securely engaged with a turning plate 34. A cover 35 in integral association with the base mount 30 is used to house the above cited components therein. Above the center of the cover 35 is disposed a rudder member 37 having a through opening 36 disposed on a tilted plane 373; a control plate 38 and a feeder plate 39 both having a pair of feeding holes 40 that are disposed in non-alignment with each other are rotatably associated with each other with the latter disposed on top of the former and above the rudder member 37. A container 41 is secured to the top of the cover 35. The container 41 is provided with a top opening 410 having a top lid 42 associated therewith and a bottom discharge hole 411 is in alignment with the feeder plate 39.

The middle of a link arm 43 is pivotally connected to one end of a supporting rod 44 which is secured to the back of the container 41 at the other end. The upper end of the link arm 43 is connected to one end of a dispelling stick 45, which has the other end thereof disposed inside the container 41 and just positioned above the feeding hole 40; the lower end of the link arm 43 is pivotally engaged with one end of a connecting rod 46 and the opposite end of the connecting rod 46 is pivotally associated with an eccentric hole disposed at the end of the rock arm 31 whereby the actuation of the rock arm 31 results in the back and forth movement of the dispelling stick 45. A pair of pickaback straps 47 is provided so as to permit an operator to carry the seeder around.

The present improved seeder is characterized in the two-section structure of the turning plate 34 having concentrically disposed inner and outer sections. The inner section is disposed at a higher level than the outer section with a plurality of spaced radial dispensing fingers 341. On the outer section of the turning plate are disposed a number of recessed dispensing grooves 342 each having an opening cut at the right end of the outer edge thereof. On the base mount 30 are disposed a plurality of through holes 301 in an area just under the outer section of the turning plate 34 whereby even when seeds or fertilizer grains are not dispensed out by the radial dispensing fingers 341 first, the same will fall in the recessed dispensing grooves 342 and will be spread again as a result of centrifugal force; and those seeds or fertilizer grains dropped between the turning plate 34 and the cover 35 will be urged by the rotatory turning plate 34 to drop into the through holes 301 so as to guarantee the turning plate 34 to run smoothly.

A guard plate 351 pivotally disposed on the wall of the cover 35 can be adjustably pivoted so as to prevent the cast seeds or fertilizer grains adjacent, to the rock arm 31 from hitting the hands of the operator.

Figure 3:
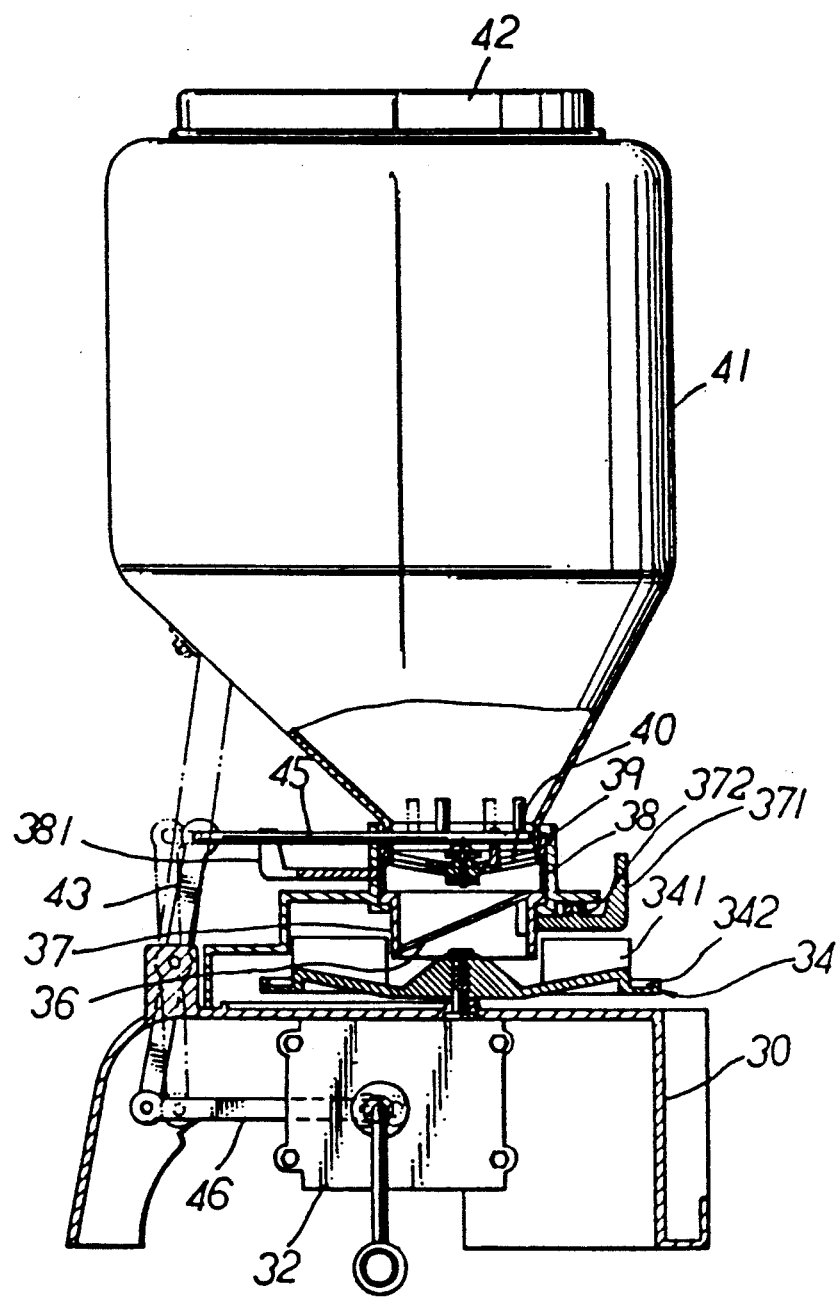
FIG. 3 is a diagram showing the operation of a dispelling stick.

Referring to FIG. 3, the dispelling stick 45 disposed just above the feeding holes 40 of the control plate 38 and the feeder plate 39 is actuated to move back and forth by the link arm 43 driven by the connecting rod 46 of the transmission means 32. The operation of the dispelling stick 45 is different from the prior art one which is operated in a swinging manner. The present dispelling stick 45 is made in a rod form so that it can be smoothly moved within the seeds and the fertilizer grains with little friction, making the seeds and grains drop smoothly in the container so as to dispense the seeds more evenly.

Figure 4:
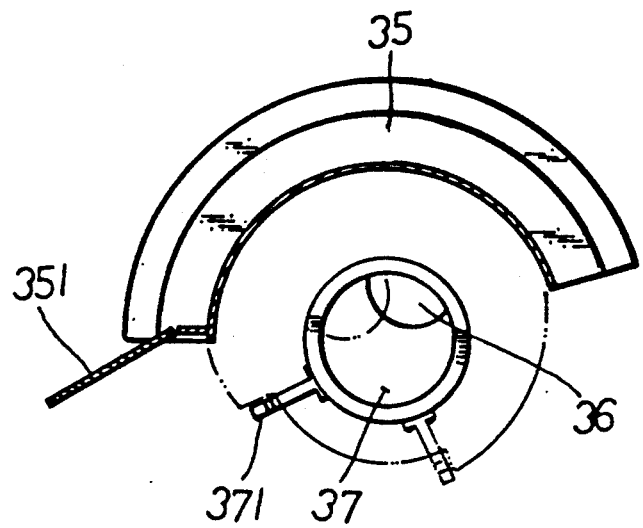
FIG. 4 is a diagram showing the operation of a rudder member of the present invention.

Referring to FIG. 4, the rudder member 37 is mounted on top of the cover 35 with the control pin 371 thereof protruding out of the cover 35 and a guide roller 372 in abutment with the outer skirt of the cover 35 so as to permit the rudder member 37 to be fixed in place somehow. The present rudder member 37 is different from the prior art one which uses engagement grooves to fix itself in place can be stagelessly adjusted. The control pin 371 is disposed adjacent to the rudder member 37 and it is not necessary to pull the same outwardly so as to effectively reduce the operational friction, resulting in the easy and smooth control of the rudder member.

Figure 5:
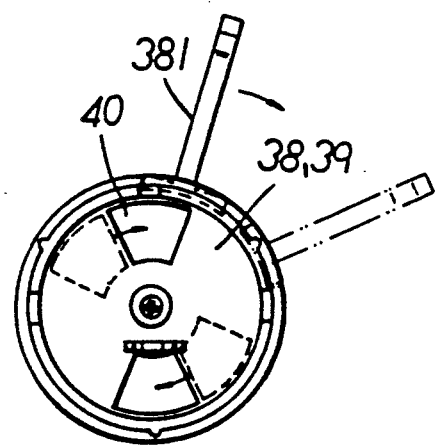
FIG. 5 is a diagram showing the operation of the control plate and the feeder plate.
Figure 6:
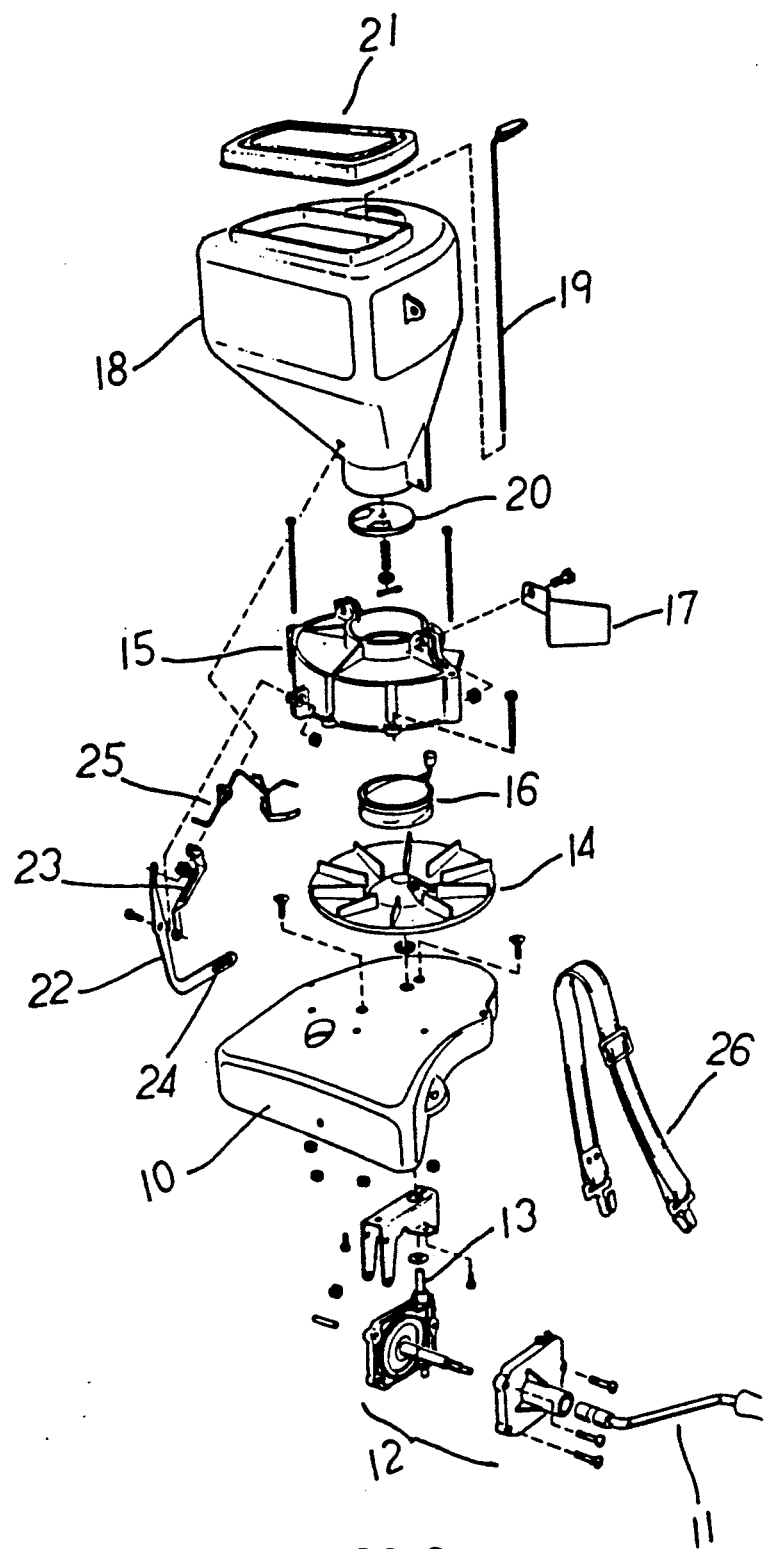
FIG. 6 is a diagram showing the exploded components of a prior art seeder.

Referring to FIG. 5, the actuation pin 381 of the control plate 38 extends out of the cover 35 without passing via the container so as to reduce the operational friction on the control plate, permitting the same to be easily and smoothly controlled.

It can be clearly seen that the present improved portable seeder has the following features:

1. The turning plate is provided with a two-section structure, permitting the seeds or fertilizer grains to be effectively dispensed in one aspect, and the structure of the turning plate can prevent the seeder from getting stuck in operation in another aspect.

2. The base mount of the present seeder is provided with a plurality of through holes so as to permit the seeds or grains that get stuck between the turning plate and the base mount to be easily cleared.

3. The guard plate can provide proper protection for the operator's hand.

4. The rudder member can be adjusted stagelessly and smoothly.

5. The dispelling stick is actuated to move back and forth and is made in a rod-like form so as to reduce the operational resistance, permitting seeds or fertilizer grains to be dispensed smoothly.

6. The actuation pin of the control plate is located outside the container so as to permit the same to be operated with little resistance and smoothly.

I claim:

1. An improved portable seeder for agricultural cultivation of seedling, comprising:

a container having a top opening for feeding seeds or fertilizer grains therein and a bottom discharge hole;

a top lid disposed on top of said container for covering said top opening;

a feeder plate disposed directly under said container having a number of feeding holes;

a control plate disposed under and rotatably mounted to said feeder plate having a plurality of feeding holes disposed in non-alignment with said feeding holes on said feeder plate;

said control plate having an outwardly extended actuation pin to rotate said control plate on said feeder plate and vary an opening formed between said feeding holes on said feeder plate and said feeding holes on said control plate respectively;

a rudder member having an outwardly extended control pin with a guide roller disposed thereon and a tilted plane defined in a middle thereof; a through opening being disposed on the periphery of said tilted plane;

said rudder member rotatably mounted on a cover disposed under said rudder member, said cover having a guard plate disposed thereon for protecting a hand of an operator;

a circular two-section turning plate having an inner section and an outer section which are concentrically disposed and said inner section being positioned at a higher level than said outer section; said inner section being provided with a plurality of spaced radial dispensing fingers; said outer section being provided with a number of consecutively disposed grooves each having an opening cut on a periphery of said outer section;

a base mount having a number of through holes disposed thereon; said turning plate being rotatably mounted onto said base mount with said through holes located under said outer section of said turning plate;

a transmission means for driving said turning plate having a rotation shaft securedly engaged with said turning plate and a rock arm which can actuate said rotation shaft to spin whereby said turning plate can be rotated accordingly;

a dispelling stick disposed above said feeding holes of said control plate and said feeder plate;

a connecting rod associated with an eccentric hole disposed at the end of said rock arm of said transmission means at one end;

a link arm having one end pivotally mounted to said connecting rod and the other end pivotally connected to said dispelling stick;

a support rod having one end pivotally fixed to the middle of said link arm and the other end thereof being secured to said container; and a pickaback strap engaged to said container.

2. An improved portable seeder as claimed in claim 1 wherein said control pin of said rudder member extends outside of said cover with said guide roller in abutment against a skirt of said cover whereby said rudder member can be rotatably adjusted on said cover.

3. An improved portable seeder as claimed in claim 1 wherein said actuation pin of said control plate is disposed outside said cover, facilitating the operation of said control plate.

* * * * *